US012767328B2

(12) United States Patent
Kaplinsky et al.

(10) Patent No.: US 12,767,328 B2
(45) Date of Patent: Oct. 20, 2026

(54) HYBRID ROAD-AIR VEHICLE

(71) Applicant: NFT Inc., Mountain View, CA (US)

(72) Inventors: Guy Kaplinsky, Los Altos Hills, CA (US); Maki Kaplinsky, Los Altos Hills, CA (US); Kohei Kanno, Santa Clara, CA (US); Jun Kishimoto, Shingletown, CA (US); Takuya Yamazaki, Sunnyvale, CA (US)

(73) Assignee: NFT INC., Mountain View, CA (US)

( * ) Notice: Subject to any disclaimer, the term of this patent is extended or adjusted under 35 U.S.C. 154(b) by 0 days.

(21) Appl. No.: 18/847,694

(22) PCT Filed: Mar. 16, 2023

(86) PCT No.: PCT/US2023/015349
§ 371 (c)(1),
(2) Date: Sep. 17, 2024

(87) PCT Pub. No.: WO2023/177774
PCT Pub. Date: Sep. 21, 2023

(65) Prior Publication Data

US 2025/0197003 A1 Jun. 19, 2025

Related U.S. Application Data

(60) Provisional application No. 63/320,896, filed on Mar. 17, 2022.

(51) Int. Cl.
*B64C 37/00* (2006.01)
*B64C 3/56* (2006.01)
(Continued)

(52) U.S. Cl.
CPC ................ *B64C 37/00* (2013.01); *B64C 3/56* (2013.01); *B64C 29/0033* (2013.01); *B64C 39/12* (2013.01)

(58) Field of Classification Search
CPC ....... B64C 3/56; B64C 37/00; B64C 29/0016; B64C 29/0033; B64C 39/12; B64C 29/0025; B64C 37/02
See application file for complete search history.

(56) References Cited

U.S. PATENT DOCUMENTS 6,619,584 B1 * 9/2003 Haynes .................... B64C 5/12 244/50
7,938,358 B2 5/2011 Dietrich et al.
(Continued)

FOREIGN PATENT DOCUMENTS

CN 103 496 305 1/2014
CN 103496305 A 1/2014
(Continued)

OTHER PUBLICATIONS

International Search Report for PCT Application No. PCT/US2023/015349 dated Jun. 29, 2023.
(Continued)

*Primary Examiner* — Joshua D Huson
*Assistant Examiner* — Anna L. Gordon
(74) *Attorney, Agent, or Firm* — Mark S. Cohen; PEARL COHEN LLP

(57) ABSTRACT

A vehicle for travelling on a road and in the air is provided, comprising a fuselage extending from a forward to a rear end along a horizontal longitudinal roll axis, a pair of main wings mounted on the rear end of the fuselage, a pair of canard wings mounted to the fuselage forward of the main wings, a plurality of wheels configured to facilitate travelling on the road, and a rotor system comprising a plurality of rotors. Each of the main and canard wings extend from the fuselage in deployed positions, and are configured to be shifted to a stowed position in which it overlies the fuselage. The rotor system comprises a pair of tiltable main rotors mounted a main wing and configured to tilt through a
(Continued)

plurality of positions between a forward position parallel with the roll axis, and an upward position parallel with the yaw axis.

16 Claims, 9 Drawing Sheets

(51) Int. Cl.
*B64C 29/00* (2006.01)
*B64C 39/12* (2006.01)

(56) References Cited

U.S. PATENT DOCUMENTS

| | | | | |
|---|---|---|---|---|
| 10,252,798 | B2 * | 4/2019 | Petrov | B64C 25/54 |
| 10,384,773 | B2 * | 8/2019 | Vondrell | B64D 29/04 |
| 10,752,352 | B2 * | 8/2020 | Brand | B64C 27/54 |
| 11,027,584 | B1 * | 6/2021 | Kiceniuk, Jr. | B60F 5/02 |
| 2011/0315809 | A1 * | 12/2011 | Oliver | B64C 39/08 244/12.4 |
| 2015/0232180 | A1 | 8/2015 | Nam | |
| 2015/0266571 | A1 * | 9/2015 | Bevirt | B64D 27/357 244/7 C |
| 2019/0176980 | A1 | 6/2019 | Brand | |
| 2020/0247536 | A1 * | 8/2020 | Mokhtarian | B64U 50/31 |

FOREIGN PATENT DOCUMENTS

| | | |
|---|---|---|
| CN | 113 753 230 | 12/2021 |
| CN | 113753230 A | 12/2021 |
| WO | WO 2020/225815 A1 | 11/2020 |

OTHER PUBLICATIONS

European search report for corresponding EP application No. 23771396.1 dated Feb. 17, 2026.

CaRnard—A New Roadable Aircraft Concept. Published Sep. 27, 1993. Downloaded from SAE International by North Caronia State Univ, Sunday Sep. 16, 2018.

* cited by examiner

HYBRID ROAD-AIR VEHICLE

CROSS-REFERENCE TO RELATED APPLICATIONS

This application is a National Phase Application of PCT International Application No. PCT/US2023/15349, International Filing Date Mar. 16, 2023, claiming the benefit of U.S. Patent Application No. 63/320,896, filed Mar. 17, 2022, which is hereby incorporated by reference.

TECHNOLOGICAL FIELD

The presently disclosed subject matter relates to vertical take-off and landing vehicles, and in particular to such vehicles which are additionally suited for use as a roadworthy form of transportation.

BACKGROUND

Surface and road vehicle traffic, especially in large urban areas, is increasing. Even in cities with well-developed public transportation systems which do not interfere with road traffic, e.g., subterranean and/or above-ground mass transit, congestion on roads due to surface vehicles typically results in extended transit times, especially during peak periods throughout the day.

Attempts to develop safe, easy to control and silent electric and hybrid car/airborne vehicle (HCAV) have gained limited success so far. The competing design requirements of the two modes of transportation, including, but not limited to, size, net lift weight, operational range and service height, external dimensions (especially when operating on a surface road), requirements/desire to enable electric-only take-off and landing, etc., have hindered many such attempts.

SUMMARY

According to an aspect of the presently disclosed subject matter, there is provided a vehicle configured for travelling on a road and for flying in the air, the vehicle comprising:

- a fuselage extending from a forward end to a rear end along a horizontal longitudinal roll axis of the vehicle;
- a pair of main wings mounted on the rear end of the fuselage;
- a pair of canard wings mounted to the fuselage forward of the main wings, each of the main and canard wings extending, in a deployed position, from the fuselage along a horizontal lateral pitch axis thereof, each of the main and canard wings being configured to be shifted to a stowed position in which it overlies the fuselage;
- a plurality of wheels configured to facilitate travelling on the road; and
- a rotor system comprising a plurality of rotors;
- the rotor system comprising a pair of tiltable main rotors, each mounted on one of the main wings and being configured to tilt through a plurality of tilted positions between a forward position in which its axis of rotation is substantially parallel with the roll axis, and an upward position in which its axis of rotation is substantially parallel with a yaw axis of the vehicle.

The rotor system may further comprise a pair of fixed main rotors, each mounted on one of the main wings such that its axis of rotation is substantially parallel with the yaw axis.

The rotor system may further comprise a pair of canard rotors, each mounted on one of the canard wings such that its axis of rotation is substantially parallel with the yaw axis.

Areas of the wings directly below at least some of the rotors may be configured to be selectively pivoted, thereby reducing the footprint of the wing in a horizontal plane perpendicular to the yaw axis.

The flight control surfaces may be configured to pivot downwardly at least substantially 90°, thereby reducing the footprint of the wing in a horizontal plane perpendicular to the yaw axis.

The flight control surfaces may comprise flaps, elevators, ailerons, flapevators, and/or flaperons.

The vehicle may further comprise a tail assembly at an aft portion of the fuselage, the main wings being attached to the top end of the tail assembly.

The tail assembly may comprise a plurality of vertical stabilizers.

At least one of the vertical stabilizers may comprise a rudder.

The main wings may be disposed at a higher vertical position than are the canard wings.

The vehicle may be configured to perform a vertical take-off/landing.

The may be configured to perform a short take-off/landing.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1A:
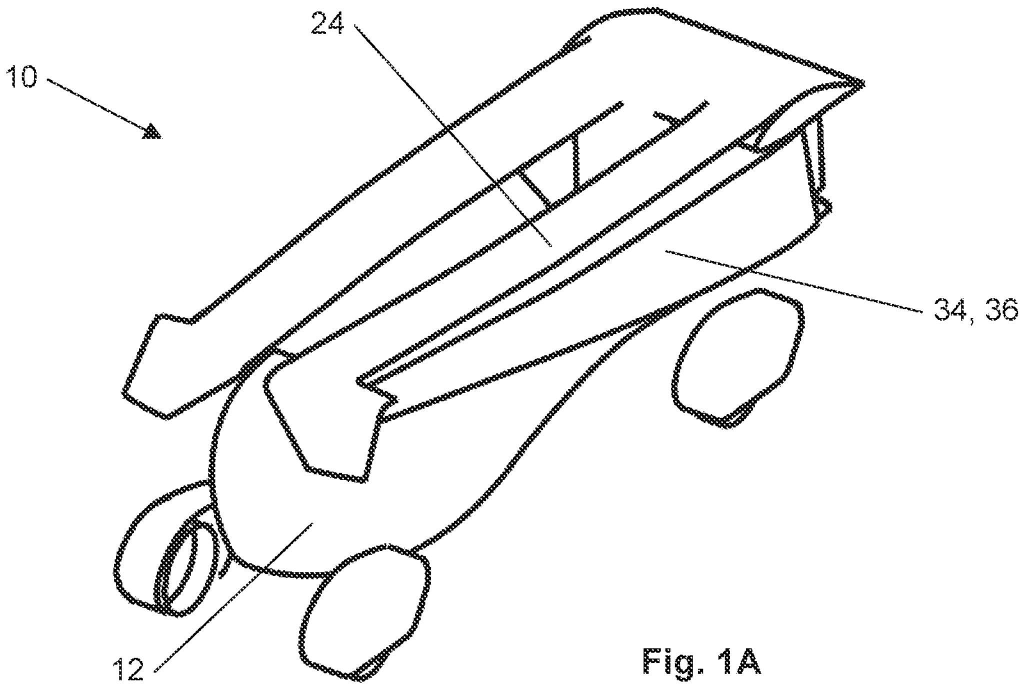
FIGS. 1A and 1B are perspective views of a vehicle according to the presently disclosed subject matter in driving and flying positions, respectively.
Figure 1B:
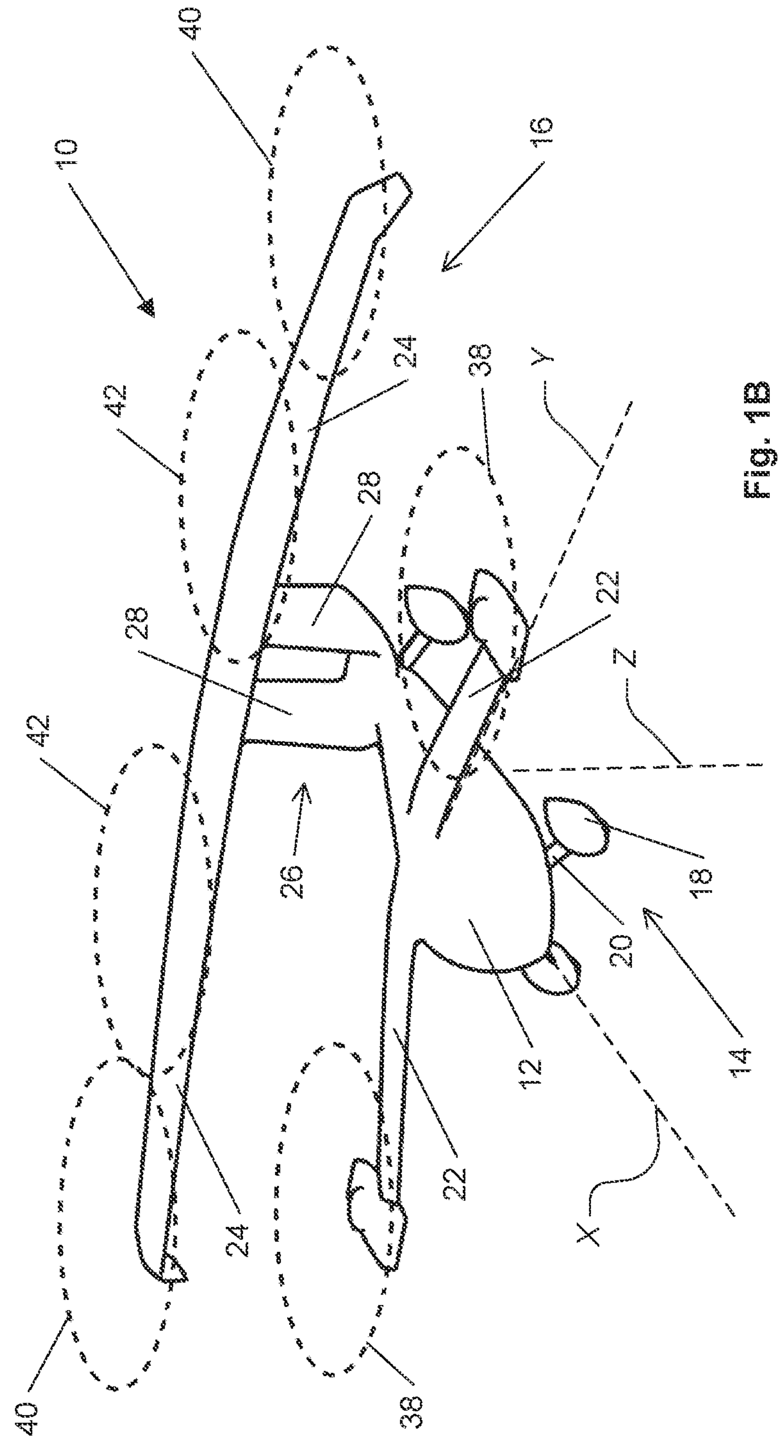

As illustrated in FIGS. 1A and 1B, there is provided a vehicle, which is generally indicated at 10, which may be selectively transformed between a driving mode (FIG. 1A) and a flying mode (FIG. 1B). In its driving mode, the vehicle 10 may be configured to operate on a road surface while complying with relevant regulations governing roadworthiness, for example in connection with one or more of its dimensions, configuration, passenger capacity, weight, etc. In flying mode, the vehicle 10 may be configured to hover, fly, and take off vertically and/or using a short runway, which are referred to in the art and in the present description as vertical take-off and landing (VTOL) and short take-off and landing (STOL), respectively. The vehicle 10 may be made of any suitable material or materials, for example comprising carbon fibers.

The vehicle defines a roll axis, a pitch axis, and a yaw axis, corresponding to aircraft principal axes, and which are indicated in FIG. 1B as X, Y, and Z, respectively.

The vehicle comprises a fuselage 12 defining a passenger cabin therewithin configured to accommodate at least one passenger (for example including a pilot). The fuselage may be made comprise a Faraday cage (not illustrated), even if otherwise made from a non-conductive material, in order to protect occupants from electric charges such as lightening, etc.

The vehicle 10 further comprises a driving arrangement, generally indicated at 14, configured to facilitate operation in the driving mode, and a flying arrangement, generally indicated at 16, configured to facilitate operation in the flying mode. It will be appreciated that some components of the driving arrangement 16 may be used during the flying mode, and vice versa.

The vehicle 10 may further comprise a controller (not illustrated) configured to direct operation thereof. It will be appreciated that while herein the term "controller" is used with reference to a single element, it may comprise a combination of elements, which may or may not be in physical proximity to one another, without departing from the scope of the presently disclosed subject matter, mutatis mutandis. In addition, disclosure herein of the controller carrying out, being configured to carry out, or other similar language, implicitly includes other elements of the vehicle carrying out, being configured to carry out, etc., those functions, without departing from the scope of the presently disclosed subject matter, mutatis mutandis.

According to some examples, the vehicle 10 further comprises one or more driver controls (not illustrated), which may comprise one or more of, but are not limited to, a gear shifter (operating mechanically or using shift-by-wire technology), a gas pedal, a brake, a yoke, and/or a sidestick. It will be appreciated that some of the driver controls (e.g., gear shifter, gas pedal, and brake) may only be used during driving mode, while others (e.g., yoke and sidestick) may only be used during flying mode.

According to some examples, the vehicle 10 is configured for autonomous (i.e., driverless) operation. Accordingly, driver controls may not be provided, or may be provided for manual override, e.g., for emergency situations.

Driving Arrangement

The driving arrangement 14 may comprise a plurality of wheels 18 configured to propel the vehicle along a surface road. The driving arrangement 14 may comprise four wheels 18 as illustrated, or any other suitable number, e.g., three, five, etc. According to some examples, each of the wheels 18 is mounted to a wheel support 20 extending outwardly from the fuselage of the vehicle. The distances between the wheels, e.g., along the pitch and/or roll axes of the vehicle may be such that they do not exceed dimensions allowed for a roadworthy vehicle.

The driving arrangement 14 may further comprise other elements (not illustrated) configured to facilitate operation on a road surface, including, but not limited to, a motor, brakes, a steering system, etc.

The driving arrangement 14 may further comprise a drive-by-wire arrangement, for example wherein some or all of the wheels 18 comprise an in-wheel motor controlled by an electronic control unit. Such an arrangement may have several advantages, including, but not limited to, increasing drivability, reducing the minimum turn radius, decreasing the number of parts and/or the total weight of the vehicle 10, etc.

According to some examples, two of the wheels 18 may comprise an in-wheel motor, wherein the remainder of the wheels may be non-driven wheels. According to other examples, any suitable number of the wheels 18, e.g., three, four, etc., may comprise an in-wheel motor.

Vehicles 10 in which the driving arrangement 14 comprises in-wheel motors, e.g., as described above, may control the wheels 18 independently of one another. This facilitates controlling the wheels according to different methods, for example based on the steering angle, e.g., without being limited by a differential gear as in some conventional vehicle designs.

Flying Arrangement

The flying arrangement 16 may comprise a wing system and a rotor system.

Wing System

Wings

According to some examples, the wing system comprises a pair of canard wings 22, and a pair of main wings 24. Each of the wings 22, 24, in its deployed position, extends outwardly from the fuselage 12, at least in the flying mode of the vehicle, generally along the pitch axis Y. Providing two sets of wings, one disposed further forward on the vehicle 10 than the other, may reduce the stall speed, and/or allow for shorter wings to be provided.

The canard and/or main wings 22, 24 may be designed such that they exhibit any suitable stall characteristics. According to some examples, the canard and/or main wings 22, 24 may be designed such that stall begins at the proximal end (i.e., adjacent the wing root) thereof, and propagates toward the distal end (i.e., adjacent the wingtip) thereof.

According to some examples, the canard and main wings 22, 24 may be designed such that in longitudinal flight, the canard wings experience stall before the main wings do. One having skill in the art will recognize that this contributes toward a safe pitch stability in a stall, and facilitates recovery afterwards.

As seen in FIG. 1A, in driving mode, each of the wings 22, 24 may be pivoted and/or folded such that they generally overlie the fuselage 12, for example not exceeding overall dimensions for a roadworthy vehicle as defined by relevant road vehicle regulations. The pivoting/folding of the wing 22, 24 may be accomplished in any suitable manner, for example as described, mutatis mutandis, in WO 2020/225815 and/or PCT/US22/18613, the full contents of which are incorporated herein by reference. In order to the increase the flutter speed and the divergence speed in view of the smaller wings, the wings 22, 24 may be reinforced, e.g., using carbon fiber tape and/or any other suitable method.

Figure 2:
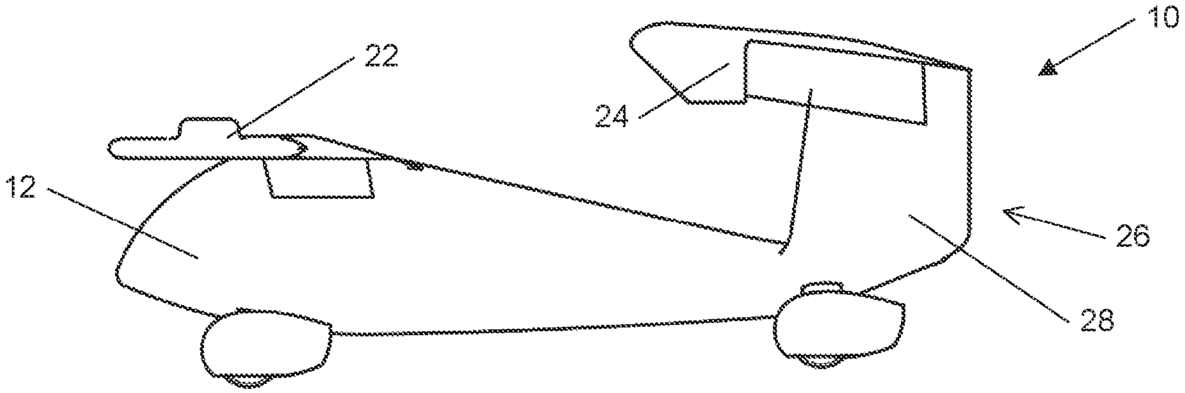
FIG. 2 is a side view of the vehicle illustrated in FIGS. 1A and 1B in its flying position.

As best seen in FIG. 2, the canard wings 22 and main wings 24 are disposed with a vertical separation therebetween (i.e., along the yaw axis Z). This may facilitate reducing effects of downwash and/or turbulence from the canard wings 22 on the main wings 24. Moreover, in the driving position, this arrangement facilitates disposing the canard wing 22 under the main wing 24, without the need for a mechanism configured to adjust their vertical dispositions with respect to one another. While in the example disclosed herein with reference to and illustrated in the appended figures the canard wings 22 are disposed such that they are lower than the main wings 24, it will be appreciated that a vehicle may be provided according to the presently disclosed subject matter in which the canard wings are disposed such that they are higher than the main wings, mutatis mutandis.

The main wings 24 are mounted on a tail assembly, generally indicated at 26. According to some examples, the tail assembly 26 comprises two or more vertical stabilizers 28, for example to handle the load imparted by the main wings 24 during flight. Each of the vertical stabilizers 28 may comprise a rudder (not illustrated), which may operate together with or independently of the rudder of the other vertical stabilizer(s). According to some examples, portions of the tail assembly 26, may be folded/pivoted in driving mode such that they operate as rear bumpers, mutatis mutandis.

It will be appreciated that mounting the main wings 24 on the tail assembly 26 may facilitate maximizing the length of the main wings. In a typical aircraft, additional lift may be provided, all other design features being equal, by providing longer wings. However, in the vehicle 10 of the presently disclosed subject matter, as the main wings 24 overlie the fuselage 12 of the vehicle 10 in its drive mode, longer wings may obstruct the driver's view. Accordingly, by mounting the main wings 24 as far rearwardly as possible, a longer maximum length is possible without obstructing a driver's view in driving mode.

Figure 3A:
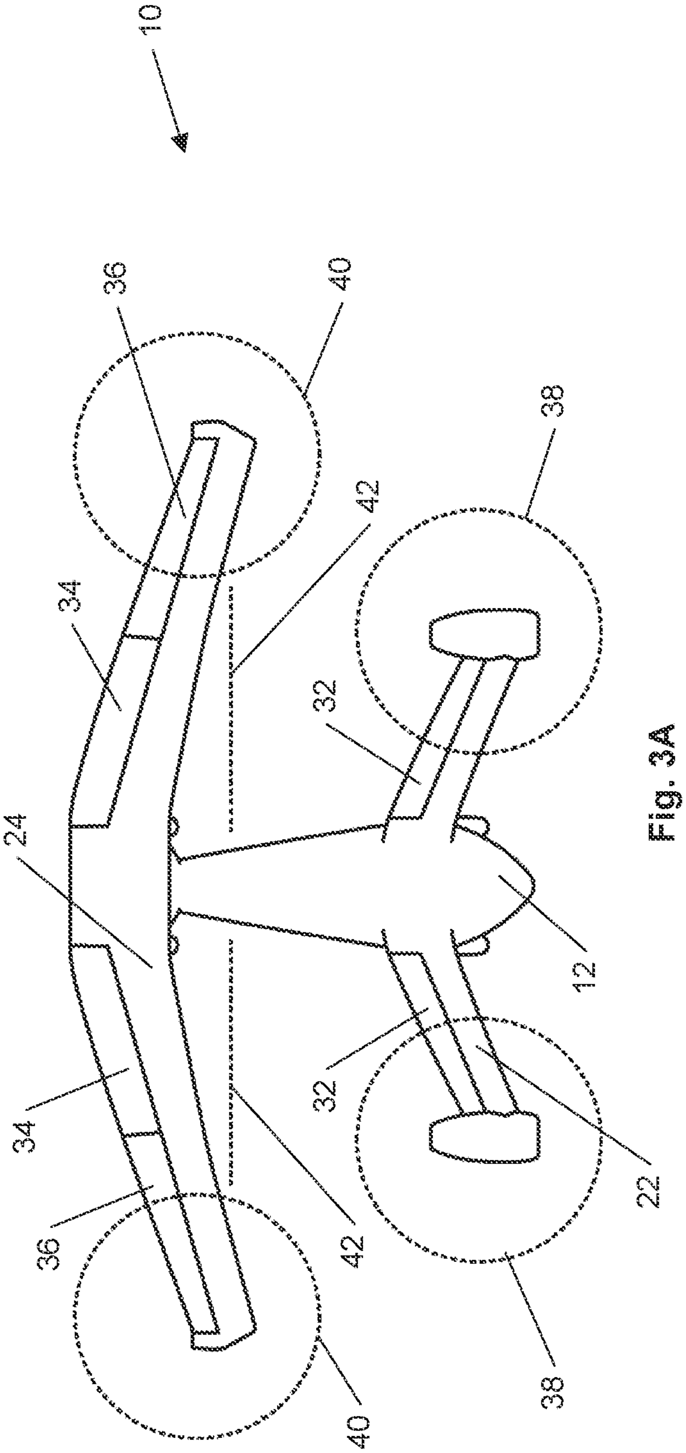
FIGS. 3A and 3B are top view of the vehicle illustrated in FIGS. 1A and 1B in its flying position.

As illustrated in FIG. 3A, the wings 22, 24 may be provided with flight control surfaces. According to some examples. the canard wings 22 may each comprise one or more flapevators 32 (i.e., combining the functions of a flap and an elevator), and the main wings 24 may each comprise one or more proximally disposed flaps 34 and one or more distally disposed flaperons 36 (i.e., combining the functions of a flap and an aileron), for example disposed on trailing edges thereof. Some or all of the flight control surfaces may comprise one or more trim tabs (not illustrated).

Providing flight control surfaces having the function, inter alia, of an elevator on the canard wings 22 may facilitate an increase in the lift-to-drag ratio of the vehicle 10 during flight, for example by allowing the canard wings to contribute to the lift, reducing trim drag, etc.

Moreover, providing flight control surfaces which have multiple functions facilitate operation of the vehicle 10 in different stages of operation. For example, the flapevators 32 may operate to provide pitch control during longitudinal flight, and to provide lift during a short take-off/landing and during transition between different stages. The flaps 34 may operate to provide lift during a short take-off/landing and during transition between different stages. The flaperons 36 may operate to provide roll control during longitudinal flight, and to provide lift during a short take-off/landing and during transition between different stages.

Figure 3B:
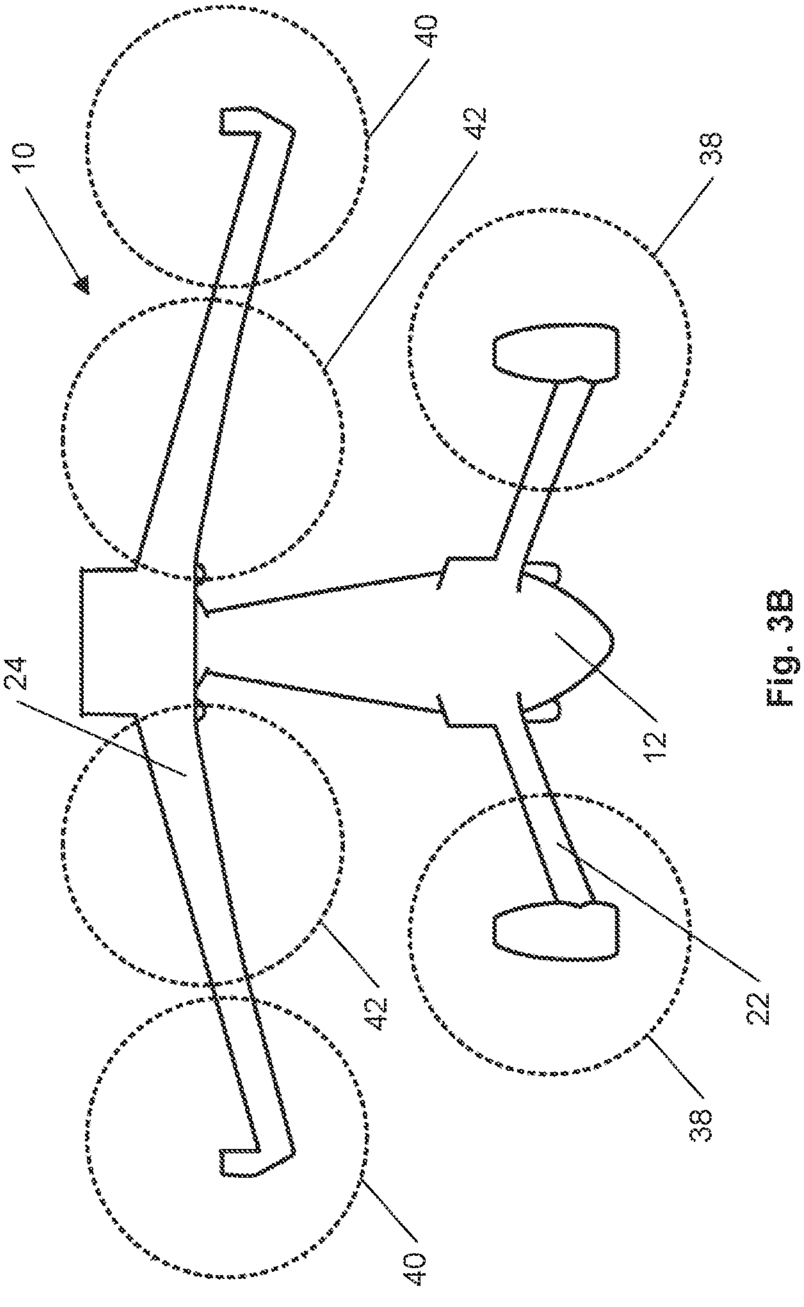

According to some examples, the flight control surfaces 32, 34, 36 are all configured to be pivoted downwardly at least substantially 90° (i.e., substantially more that would ordinarily be necessary for their function), for example as illustrated in FIG. 3B, thereby reducing the footprint of the wings in the horizontal plane. The significance of this will be described below.

It will be appreciated that while the wings 22, 24 are described herein as comprising specific flight control surfaces, this is by way of example only, inter alia to describe that the wings 22, 24 are configured to selectively reduce their horizontal footprint. Examples of the vehicle 10 in which the functions of one or more of the flight control surfaces differs from that suggested by the name (e.g., wherein the canard flapevators 32 perform the functions of flaps only), and/or wherein the canard wings 22 and/or main wings 24 comprise a number of flight control surfaces which is different than what is described above with reference to and as illustrated in the accompanying drawings, are within the scope of the presently disclosed subject matter, mutatis mutandis.

Hinge Assembly

Figure 5A:
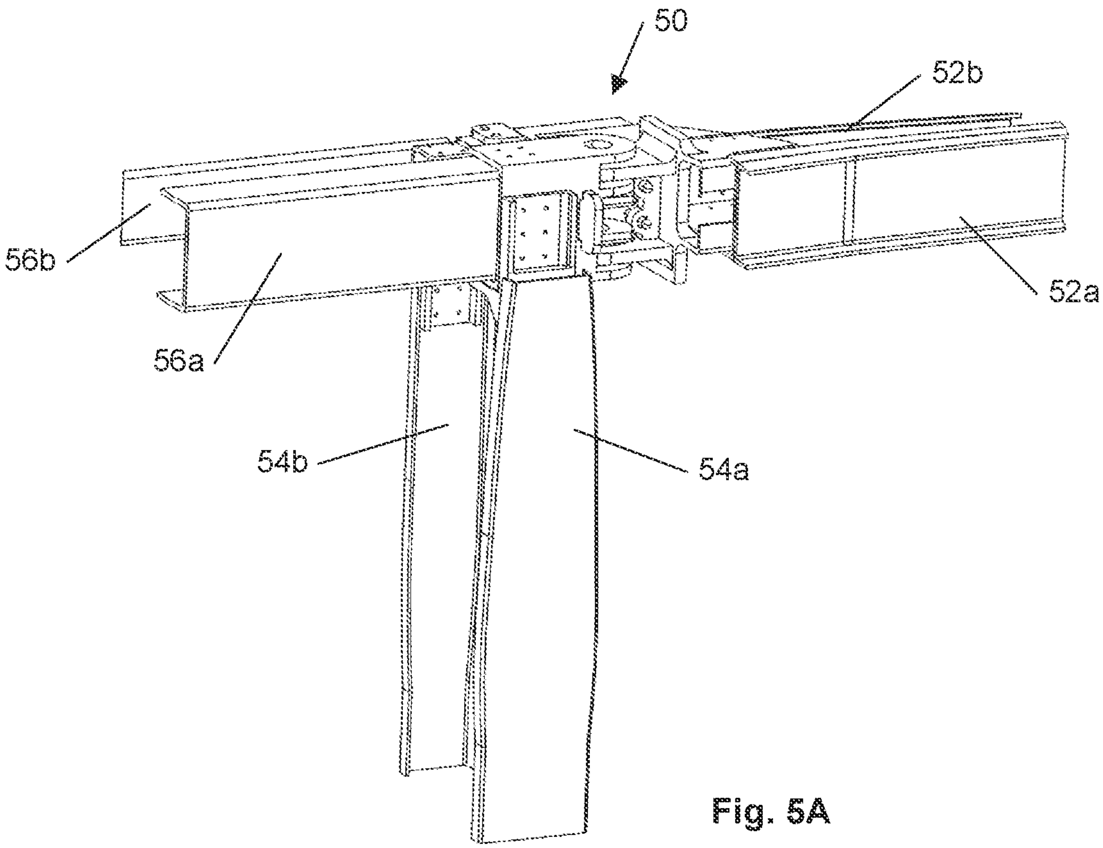
FIG. 5A is a front perspective view of a hinge assembly of the vehicle illustrated in FIGS. 1A and 1B, showing attachment to several structural elements of the vehicle.
Figure 5B:
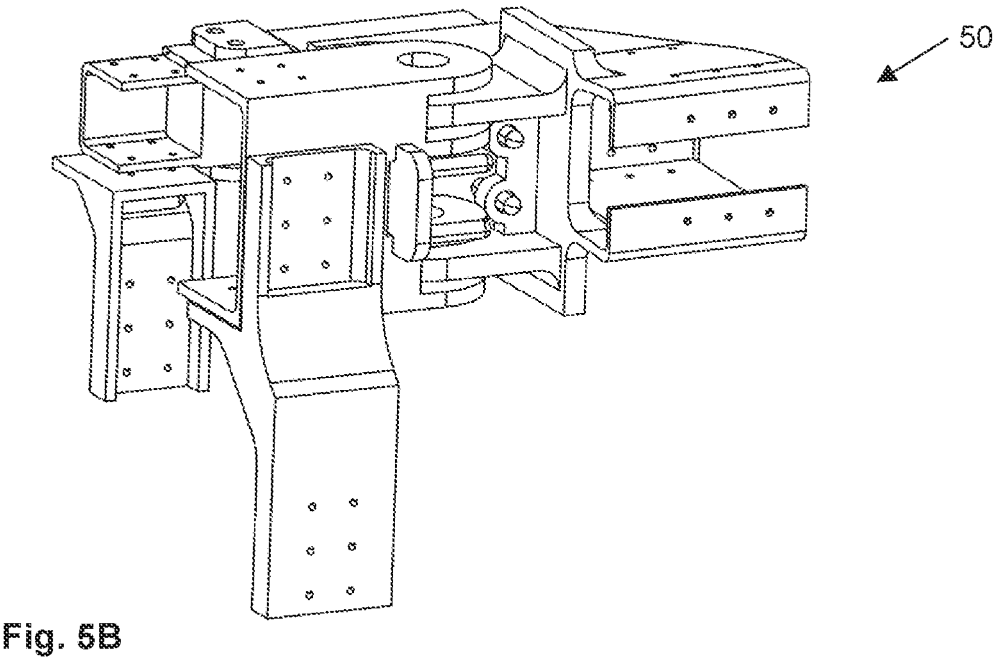
FIG. 5B is the front perspective view of the hinge assembly of FIG. 5A, in which structural elements have been removed.

According to some examples, for example as illustrated in FIGS. 5A, each of the main wings 24 may be articulated to the top of the vertical stabilizers 28 of the tail assembly by a hinge assembly 50. The hinge assembly 50 is configured for attachment to fore and aft wing spars 52*a*, 52*b* of the main wing 24, fore and aft stabilizer spars 54*a*, 54*b* of the vertical stabilizer 28, and fore and aft carry-through supports 56*a*, 56*b* of the tail assembly 26, which span between the vertical stabilizers thereof.

Figure 5C:
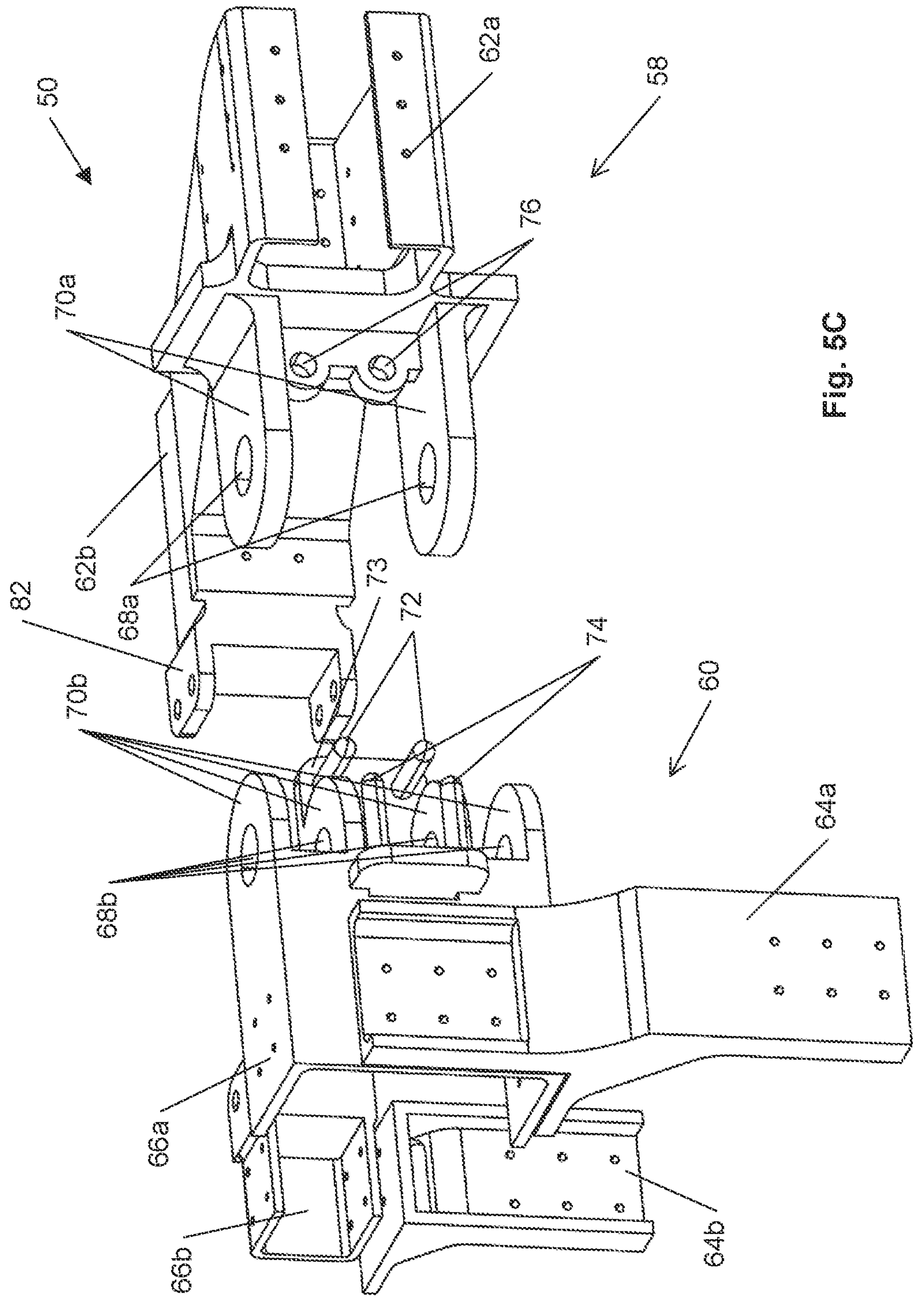
FIG. 5C is an exploded view of the hinge assembly of FIG. 5B.
Figure 5D:
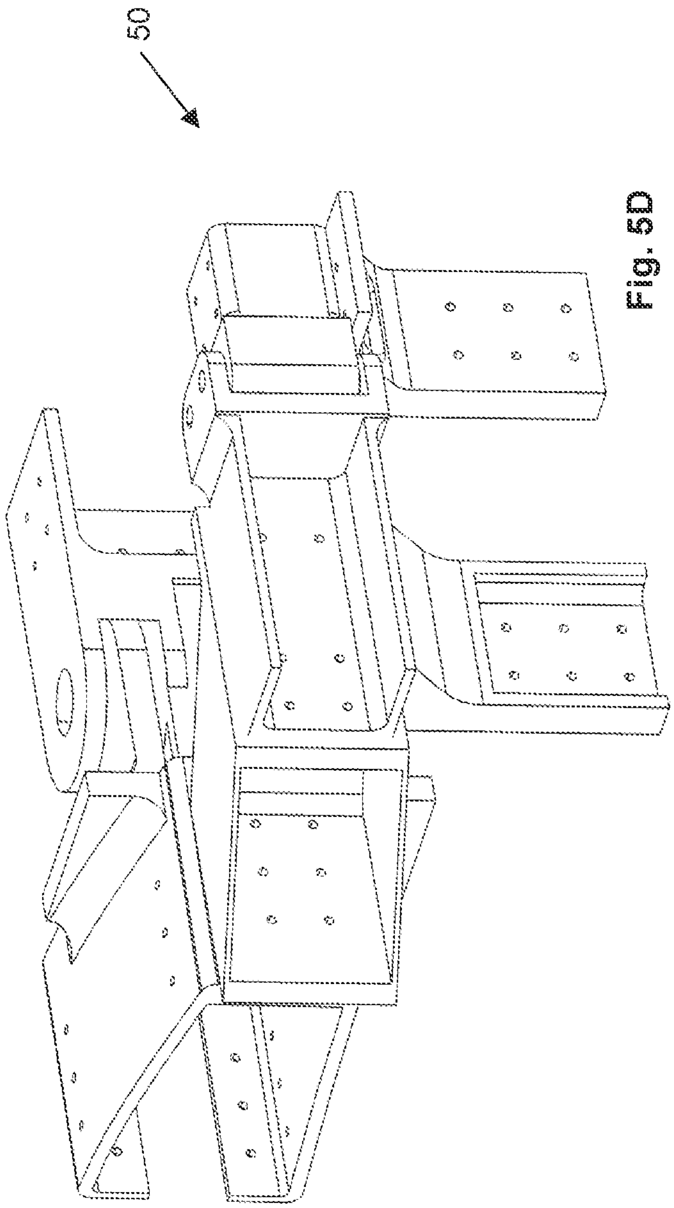
FIG. 5D is a rear perspective view of the hinge assembly illustrated in FIG. 5A, in which structural elements have been removed.
Figure 5E:
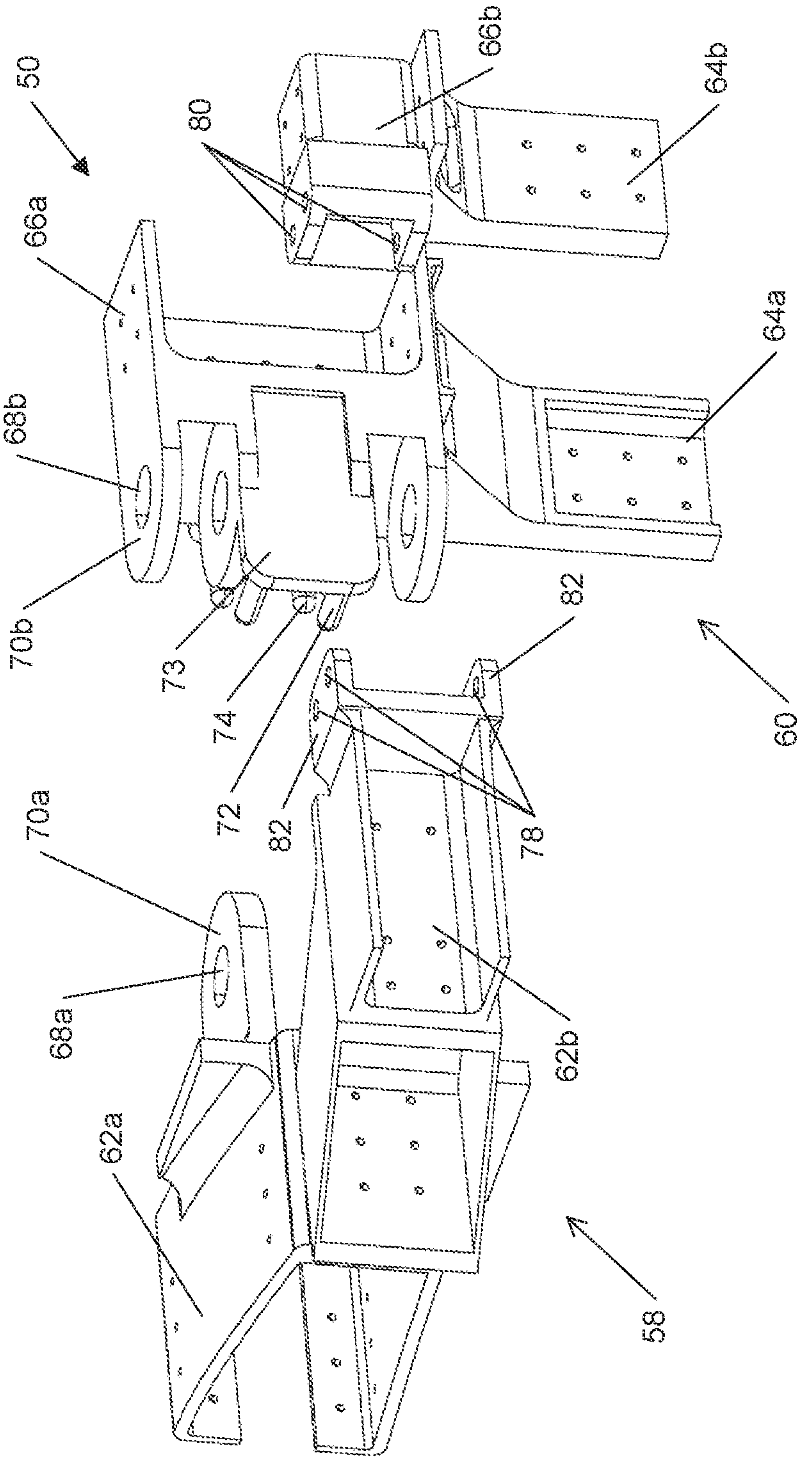
FIG. 5E is an exploded view of the hinge assembly of FIG. 5D.

As best seen in FIGS. 5B through 5E, and as specifically indicated in FIGS. 5C and 5E, the hinge assembly 50 comprises a wing portion 58 configured to be rigidly connected to one of the main wings 24, and a fuselage portion 60 configured to be rigidly mounted to the fuselage or to an element which is rigidly connected thereto (in this case to the tail assembly 26). The wing portion 58 comprises fore and aft spar-mounts 62*a*, 62*b* configured for rigidly mounting thereto the fore and aft wing spars 52*a*, 52*b*, respectively. The fuselage portion 60 comprises fore and aft stabilizer spar-mounts 64*a*, 64*b* configured for rigidly mounting thereto fore and aft stabilizer spars 54*a*, 54*b*, respectively, and fore and aft carry-through-mount 66*a*, 66*b* configured for rigidly mounting thereto the fore and aft carry-through supports 56*a*, 56*b*, respectively, of the tail assembly 26.

The wing portion 58 and fuselage portion 60 are pivotally articulated to one another by a hinge-pin (not illustrated) passing through apertures 68*a*, 68*b* formed in respective lugs 70*a*, 70*b* of the wing and fuselage portions of the hinge assembly 50, facilitating pivoting between an open position (shown in FIGS. 5A through 5E) in which the main wings 24 are in their deployed positions, and a closed position in which the main wings overlie the fuselage 12.

The fuselage portion 60 may comprise one or more open-support pins 72 projecting from a backplane 73 and optionally a corresponding number of closed-support pins 74, with the wing portion 58 comprising a corresponding number of support apertures 76. In the open position of the hinge assembly 50 (as shown; wherein the main wing 24 are in their deployed positions), the open-support pins 72 are received within the support apertures 76, thereby facilitating transferring loads (e.g., shear and/or moment) from the main wing 24 to the fuselage 12. In the closed position of the hinge assembly 50 (not shown; wherein the main wings 24 overlie the fuselage 12), the closed-support pins 74 are received within the support apertures 76, similarly facilitating transfer of loads from the main wing 24 to the fuselage 12.

The support pins 72, 74 may be of any suitable design, e.g., tapered, curved, etc., to allow the support apertures 76 to easily engage/disengage them when the hinge assembly 50 pivots between its open and closed positions.

It will be appreciated that while the support pins 72, 74 are described herein with reference to and illustrated in the accompanying figures as constituting part of the fuselage portion 60 of the hinge assembly 50, with the support apertures 76 constituting part of the wing portion 58 of the hinge assembly, the hinge assembly may be provided with the support pins 72, 74 constituting part of the wing portion and the support apertures 76 constituting part of the fuselage portion 58 of the hinge assembly without departing from the scope of the presently disclosed subject matter, mutatis mutandis.

The wing and fuselage portions 58, 60 of the hinge assembly may be configured to be rigidly secured to one another when the hinge assembly 50 is in its open position. Such an arrangement facilitates maintaining continuity between the main wings 24 and tail assembly 26 during flight, even when the wings are subject to shear and drag forces. According to some examples, the aft spar-mount **62*b* of the wing portion 58 and the aft stabilizer spar-mount 64*b* each comprise locking apertures 78, 80, each of which is aligned with a corresponding one or more of the locking apertures of the other portion when the hinge assembly 50 is in its open position. Moreover, the aft spar-mount 62*b* may comprise top and bottom faces 82, configured to snuggly receive therebetween the aft stabilizer spar-mount 64*b* when the hinge assembly 50 is in its open position (or the reverse). The vehicle 10 is configured to insert a locking pin (not illustrated) through corresponding locking apertures 78, 80 of the wing and fuselage portions 58, 60, thereby rigidly securing them together. When the hinge assembly 50 is to be pivoted to its closed position, the vehicle 10** is configured to remove the locking pins.

It will be appreciated that the hinge assembly 50 as described above with reference to and as illustrated in FIGS. 5A through 5E facilitates efficient and redundant load transfer between the main wings 24 and the fuselage 12 (via the tail assembly 26). For example, shear loads due to lift and vertical thrust, e.g., acting along the yaw axis Z, may be transferred via the lugs **70*a*, 70*b* and/or the support pins 72, 74; shear loads due to drag, e.g., acting along the roll axis X, and/or shear side loads, e.g., acting along the pitch axis Y, may be transferred via the hinge-pin, the support pins 72, 74 (e.g., including their associated backplates) and/or the locking pins; bending moments about the roll axis X (or an axis parallel thereto) may be transferred through the hinge-pin couple and/or the support pins 72, 74; pitching moments about the pitch axis Y (or an axis parallel thereto) may be transferred through the hinge-pin couples and/or the top and bottom faces 82 of the aft spar-mount 62*b* on the aft stabilizer spar-mount 64*b* (or the top and bottom faces of the aft stabilizer spar-mount 64*b* on the aft spar-mount 62*b*, depending on how the hinge assembly is provided); folding/unfolding moments about the yaw axis Z (or an axis parallel thereto) may be transferred by the locking pins. Accordingly, the hinge assembly 50 may function to address challenges which may arise by providing the main wings 24 on the tail assembly 26** as described herein.

It will be appreciated that while the hinge assembly 50 is described herein with reference to the main wings 24, a similar hinge assembly may be provided for the canard wings 22, mutatis mutandis.

Rotor System

The rotor system comprises a plurality of rotors, for example mounted on the wing system. (In the accompanying figures, rotors are represented by broken-line circles illustrating their positions when rotating.)

According to some examples, the rotor system comprises a pair of canard rotors 38, each mounted on one of the canard wings 22, for example at or near a distal end thereof. The canard rotors 38 may be situated, at least in the flying mode, on top of the canard wings 22, and be configured to rotate in a plane substantially perpendicular to the yaw axis Z.

The rotor system may further comprise a pair of fixed main rotors 40, each mounted on one of the main wings 24, for example near a proximal end thereof, and a pair of tiltable main rotors 42, each mounted on one of the main wings, for example at or near a distal end thereof. (It will be appreciated that the term "main rotor" refers to their position on the main wing, and is not to be construed as indicating a particular importance to them).

The fixed main rotors 40 may be situated, at least in flying mode, on top of the main wings 24, and be configured to rotate in a plane substantially perpendicular to the yaw axis Z.

Figure 4:
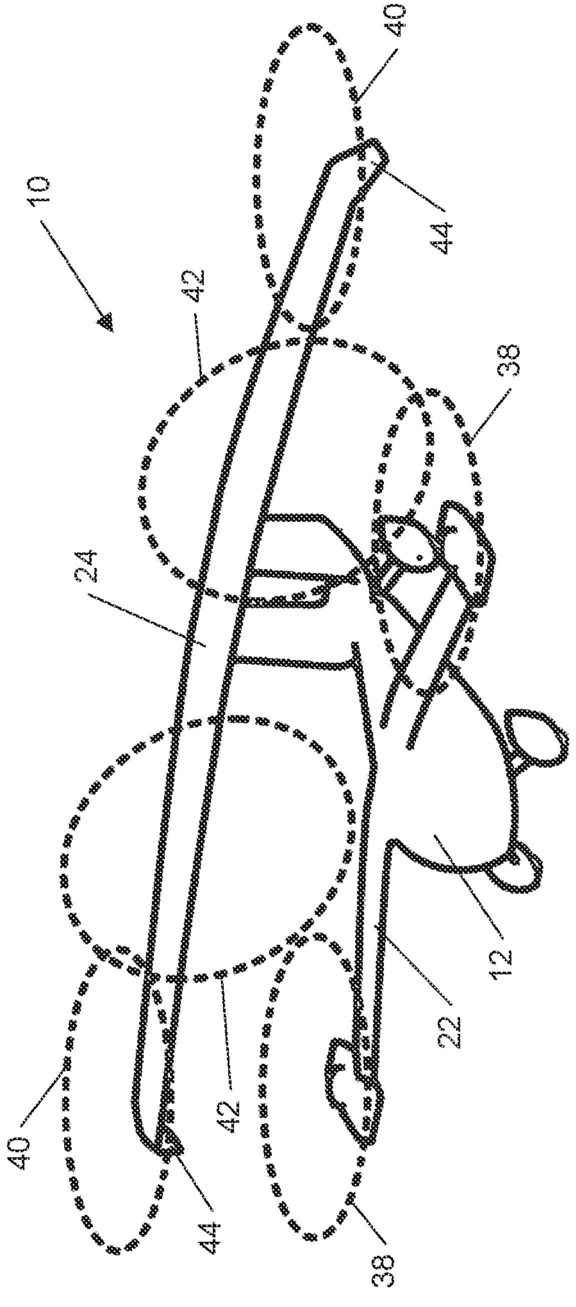
FIG. 4 is a perspective view of the vehicle illustrated in FIGS. 1A and 1B in its flying position, with tiltable rotors thereof in their forward positions.

The tiltable main rotors 42 may be situated, at least in flying mode, on the main wings 24, such that they may tilt between an upward position (for example as illustrated in FIG. 1B) in which they are configured to rotate in a plane substantially perpendicular to the yaw axis Z, and a forward position (for example as illustrated in FIG. 4) in which they are configured to rotate in a plane substantially perpendicular to the roll axis X.

Providing rotors on both the canard wings 22 and main wings 24 allows adjustment of the center of pressure of the vehicle during hovering. Accordingly, this design facilitates operating the vehicle 10 to have the same center of pressure when flying (i.e., when the wings 22, 24 provide the lift) and when hovering (i.e., when the rotor system provides the lift).

Some or all of the rotors 38, 40, 42 may comprise any suitable number of blades. According to some examples, each of the rotors 38, 40, 42 comprises two blades, for example in order to reduce the size of the vehicle 10 when in its drive mode.

According to some examples, the blades of some or all of the rotors 38, 40, 42 may be tiltable, i.e., they may be configured to change their pitch angle, i.e., their position along an axis which is perpendicular to the axis of rotation of the rotor, irrespective of whether or not the rotor itself is configured to tilt.

During use of the rotors, the flight control surfaces (e.g., the flapevators 32 of the canard wing 22, and the flaps 34 and flaperons 36 of the main wing 24) may be configured to pivot downwardly, thereby reducing the footprint of the wing in the horizontal plane, as described above. Accordingly, less of the air deflected downwardly by the rotors is blocked by the wing, effectively increasing the lift provided thereby for the same operating parameters (e.g., rotor speed, tilt angle of the blades, air conditions, etc.). Similarly, according to some examples, some or all of the wings may comprise foldable tips 44 configured to be folded downwardly, further reducing the footprint of the wing in the horizontal plane (this is shown with respect to the main wing 24, but the canard wing 22 may be so provided according to some examples).

It will be appreciated that the rotor system may comprise additional rotors, and/or fewer rotors, for example wherein the functions of two or more rotors are combined into a single rotor, mutatis mutandis.

It will be further appreciated that rotors disclosed as being fixed and/or not disclosed as being tiltable may be provided with such an option. For example, the fixed main rotors 40 may be configured to tilt between upward and forward positions, similar to the respective positions of the tiltable main rotors 42, mutatis mutandis.

Operating Modes

Driving Mode

In the driving mode, the components of the vehicle 10 are arranged so as to suit it for operation on a public roadway. The wings 22, 24 are folded/pivoted (for example as illustrated in FIG. 1A) such that they overlie the fuselage 12 of the vehicle 10, for example such that its external dimensions comply with relevant regulations concerning roadworthiness. Moreover, the rotors 38, 40, 42, may be suitably positioned, for example locked into suitable positions. When overlying the fuselage 12, the wings 22, 24 (including the rotors 38, 40, 42) may afford the driver a field of view which is suitable for driving, for example about or exceeding 30° above the eyelevel of a typical driver, and/or about or exceeding 15° below the eyelevel of a typical driver. The driving arrangement 14, including, inter alia, the wheel 18 are active in the driving mode, while most elements of the flying arrangement 16 are inactive.

As further illustrated in FIG. 1A, according to some examples the flight control surfaces of the main wings 24 may be folded downwardly when the vehicle 10 is in its driving mode (for simplicity, the flaps 34 and flaperons 36 of each of the main wings described above are illustrated as a single element in FIG. 1A). The reduces the exposure of the canard wings 22 (not seen in FIGS. 1A) to damage when driving. Moreover, by providing the main wings 24 on the rear of the vehicle 10, when they are pivoted inwardly in the driving mode, their leading edges are inward, which reduces their exposure to damage. As the leading edges of the wings produce more lift than do the trailing edges, this arrangement increases the efficiency of the vehicle 10 in flying mode in the event that it experiences damage in driving mode.

Flying Mode

In the flying mode, the components of the vehicle 10 are arranged such that it is configured for efficient flying. In particular, the wings 22, 24 are extended, and, depending on the operation, some or all of the rotors 38, 40, 42 may be operational. Such operations may include taking off and landing (which may be conventional, short, or vertical), longitudinal flight, hovering, etc., and/or transitions therebetween.

In a hovering operation, all of the rotors 38, 40, 42 may be operational. According to some examples, the tiltable main rotors 42 are tilted into their upward position as described above, thereby providing lift. The flight control surfaces are pivoted downwardly as described above, and any foldable tips 44 of the wings are folded downwardly. The controller may monitor flight parameters and adjust operation parameters, including, but not limited to, rotation speed of each of the rotors 38, 40, 42, tilt angle of the blades, etc. In a vertical take-off/landing, the vehicle 10 generally performs a hovering operation.

In a longitudinal flying operation, the tiltable main rotors 42 are tilted into their forward position as described above, thereby providing thrust. The other rotors 38, 40 may be non-operational, but may be selectively engaged as needed, for example in case of partial failure. According to some examples, at least some of the rotors 38, 40 may be operational during longitudinal flying (e.g., wherein the fixed main rotors 40 are configured to be tilted into a forward position as described above). The flight control surfaces may be operated in any suitable manner, for example as is known in the art for longitudinal flight. The vehicle 10 may operate similarly during a conventional take-off/landing, mutatis mutandis, and be further configured to activate portions of the driving arrangement 14 as necessary.

In a transition from hovering to longitudinal flying, the tiltable main rotors 42 tilt from their upward positions to the forward positions. As this occurs, lift from the rotor system is reduced and/or the other rotors 38, 40 increase their power to at least partially compensate for the loss of lift from the tiltable main rotors, while thrust increases, leading to an increase in lift from the wing system. During this transition, the controller may be configured to optimize, e.g., energy usage, by carefully regulating the tilt angle of the tiltable main rotors 42—thereby regulating the tradeoff between lift provided directly by the rotors and lift provided by the wing system—between the upward and forward positions. This may be accomplished according to a predetermined mapping between longitudinal airspeed and the tilt angle of the tiltable main rotors 42, using a real time feedback control loop, and/or by any other suitable means. A transition from longitudinal flying to hovering may be accomplished in a similar fashion in reverse, mutatis mutandis.

A short take-off/landing may be accomplished in a similar fashion, mutatis mutandis. For example, the vehicle 10 may initially provide thrust using the driving arrangement 14, thereby producing lift by the wing system, and supplement both the thrust and the lift with the tiltable main rotors 42 in a tilted position being between the upward and forward positions (optionally operating the other rotors 38, 42 to provide additional lift). The tiltable main rotors 42 are gradually tilted into their forward positions for longitudinal flight.

According to some examples, the vehicle 10 may be configured to automatically activate relevant components of the flying arrangement 16 as necessary to perform operations determined by the driver. According to other examples, the vehicle may be configured to allow manual control of at least some of the components of the flying arrangement 16, either as their primary method of operation, or to allow the driver to manually overrise the automatic control.

Power

The vehicle 10 may comprise a power distribution system, configured to manage use of power. According to some examples, the power distribution system is configured to selectively electrically disconnect specific components, e.g., based on the mode of operation. This may be performed in order to prevent accidental activation of a component when not needed, for example to prevent undesirable and/or dangerous operation of the vehicle 10. According to some examples, this may be accomplished by providing a plurality of power bus lines, each configured to provide power to one or more components. The controller may be configured for selectively disconnect each of the bus lines from the power source of the vehicle 10, for example by directing operation of one or more relay switches.

For example, the power distribution system may be configured to electrically disconnect from components of the driving arrangement 14, such as the motor and/or in-wheel motors thereof, before takeoff. As these components are generally not necessary during flight, accidental powering thereof wastes energy. Other components relevant to driving only, such as an airbag, etc., may be disconnected once the vehicle 10 is in flight.

Similarly, the power distribution system may be configured to electrically disconnect actuators configured to pivot and/or fold the wings 22, 24 before takeoff. This removes the possibility of their accidentally pivoting/folding the wings 22, 24 from their deployed position during flight.

The power distribution system may be configured to electrically disconnect the rotor system during the driving mode of the vehicle. The controller may be configured to connect According to some examples, the vehicle 10 may comprise a battery pack, for example comprising a plurality of cells. The power distribution system may be configured to selectively connect some of the cells to utilize them, depending on the power requirements of the vehicle 10. According to some examples, the power distribution system is configured to determine not only how many cells to connect, but which ones. The choice of which cells to connect may be based, inter alia, on the capacity of each of the cells, the usage history of each cell (e.g., how many amp-hours it has supplied over its lifetime compared to the other cells), etc.

The battery pack may be mounted within the vehicle 10 such that they may be selectively moved, for example generally along the roll axis X. The controller may be configured to direct that the battery be so moved in order to adjust the center of gravity of the vehicle as necessary. This may be accomplished in any suitable way. According to some examples, the battery pack may be mounted on one or more rails, and a motor, e.g., a stepper motor, and optionally a gear system may be provided to selectively adjust the position of the battery pack along the rails.

The vehicle 10 may comprise a range extender configured to charge the battery pack during operation of the vehicle, which may be selectively operated to charge some or all of the battery packs.

Navigation

The controller may implement a navigation system to determine an optimal route for the vehicle. The navigation system may take into account road and/or airspace conditions (for example as received from an air-traffic control system), the state (i.e., fully operational, partially operational, failure) of components of the vehicle 10, charge state of the battery pack, etc.

According to some examples, the navigation system may determine a route based on the availability of charging stations therealong, for example in view of the charge state of the battery pack. Moreover, the controller may selectively operate the range extender based on the present capacity of the battery pack and the distance to an available charging station which is closest to the vehicle's 10 location and/or to the planned route.

Cameras and Sensors

The vehicle 10 may comprise one or more exterior cameras. According to some examples, the vehicle 10 comprises a rear camera. During drive mode, the rear camera may operate as a backup camera, i.e., face horizontally along the roll axis X and display a view from the rear of the vehicle 10 when in reverse. During hovering, e.g., while the vehicle 10 is performing a vertical takeoff/landing, the rear camera may be tilted approximately 90° such that it faces downwardly, thereby providing the driver with a view of the area below the rear of the vehicle.

According to some examples, the vehicle 10 comprises a surround-view camera, e.g., mounted on the forward portion of the fuselage 12. During hovering, e.g., while the vehicle 10 is performing a vertical takeoff/landing, the surround-view camera may be configured to tilt approximately 90°, thereby providing the driver with a view of the area above the vehicle 10.

According to some examples, the vehicle 10 comprises a radio altimeter, mounted on the bottom of the fuselage 12. In the flying mode, the radio altimeter may be directed towards the ground, in order to provide information regarding the altitude of the vehicle 10. In the driving mode, the radio altimeter may be tilted approximately 90°, so that it may be used to provide information about oncoming traffic/obstacles (if facing forward) or vehicles approaching from the rear (if facing rearwards).

Lights and Other Indicators

The vehicle 10 may be provided with exterior lights, for example for illumination and/or signaling. According to some examples, signaling lights may be provided as LED lights. At least some of the signaling lights may operate as an indicator light e.g., to indicate a planned turn, brake operation, etc., in driving mode, and as a navigation light, e.g., to provide information regarding the vehicle's 10 position, heading, status, etc., in flying mode. Illumination lights may operate as headlights in driving mode, and as landing lights in flying mode.

Moreover, the colors of the lights may change based on the mode, and some of the lights may flash during transition between modes, e.g., to serve as a warning to others. According to some examples, the vehicle 10 may further comprise an audio signal.

Those skilled in the art to which this invention pertains will readily appreciate that numerous changes, variations, and modifications can be made without departing from the scope of the presently disclosed subject matter, mutatis mutandis.

The invention claimed is:

1. A vehicle configured for travelling on a road and for flying in the air, the vehicle comprising:

a fuselage extending from a forward end to a rear end along a horizontal longitudinal roll axis of the vehicle;

a pair of main wings mounted on a tail assembly at the rear end of the fuselage configured to support a pair of tiltable rotors and a pair of fixed, non-tiltable rotors, each main wing extending, in a deployed position, from the fuselage along a horizontal lateral pitch axis thereof;

a pair of canard wings mounted to the fuselage forward of the main wings, each of the canard wings extending, in a deployed position, from the fuselage along a horizontal lateral pitch axis thereof, wherein each of the main wings and canard wings is pivotable and/or foldable to a stowed position in which they overlie the fuselage;

a rotor system comprising a plurality of rotors;

the rotor system comprising the pair of tiltable rotors, each mounted on one of the main wings and being configured to tilt through a plurality of tilted positions between a forward position in which an axis of rotor rotation is substantially parallel with the roll axis, and an upward position in which the axis of rotor rotation is substantially parallel with a yaw axis of the vehicle; and a plurality of wheels configured to facilitate travelling on the road.

2. The vehicle according to claim 1, the rotor system further comprising the pair of fixed, non-tiltable rotors, each mounted on one of the main wings such that the axis of rotation remains substantially parallel with the yaw axis, and a pair of fixed, non-tiltable canard rotors, each mounted on one of the canard wings such that the axis of rotation remains substantially parallel with the yaw axis.

3. The vehicle according to claim 2, wherein areas of the pair of main wings directly below at least some of the rotors are configured to be selectively pivoted, thereby reducing the footprint of the main wings in a horizontal plane perpendicular to the yaw axis.

4. The vehicle according to claim 3, the main wings comprising flight control surfaces, the flight control surfaces being configured to pivot downwardly substantially up to 90°, thereby reducing the footprint of the main wings in a horizontal plane perpendicular to the yaw axis.

5. The vehicle according to claim 2, wherein areas of the pair of canard wings directly below at least some of the rotors are configured to be selectively pivoted, thereby reducing the footprint of the canard wings in a horizontal plane perpendicular to the yaw axis.

6. The vehicle according to claim 5, the canard wings comprising flight control surfaces, the flight control surfaces being configured to pivot downwardly substantially up to 90°, thereby reducing the footprint of the canard wings in a horizontal plane perpendicular to the yaw axis.

7. The vehicle according to claim 2, wherein the main wings are disposed at a higher vertical position than are the canard wings.

8. The vehicle according to claim 1, wherein areas of the pair of main wings directly below at least some of the rotors are configured to be selectively pivoted, thereby reducing the footprint of the main wings in a horizontal plane perpendicular to the yaw axis.

9. The vehicle according to claim 8, the main wings comprising flight control surfaces, the flight control surfaces being configured to pivot downwardly substantially up to 90°, thereby reducing the footprint of the main wings in a horizontal plane perpendicular to the yaw axis.

10. The vehicle according to claim 9, wherein a flight control surface is selected from a group consisting of: a flap, an elevator, an aileron, a flapevator, and a flaperon.

11. The vehicle according to claim 1, the main wings being attached to the top end of the tail assembly.

12. The vehicle according to claim 11, the tail assembly comprising a plurality of vertical stabilizers.

13. The vehicle according to claim 12, at least one of the vertical stabilizers comprising a rudder.

14. The vehicle according to claim 1, wherein the main wings are disposed at a higher vertical position than are the canard wings.

15. The vehicle according to claim 1, configured to perform a vertical take-off/landing.

16. The vehicle according to claim 1, configured to perform a short take-off/landing.

* * * * *